March 2, 1971  J. J. MATTHEWS  3,566,466
CABLE REDUCING TOOL
Filed April 17, 1969
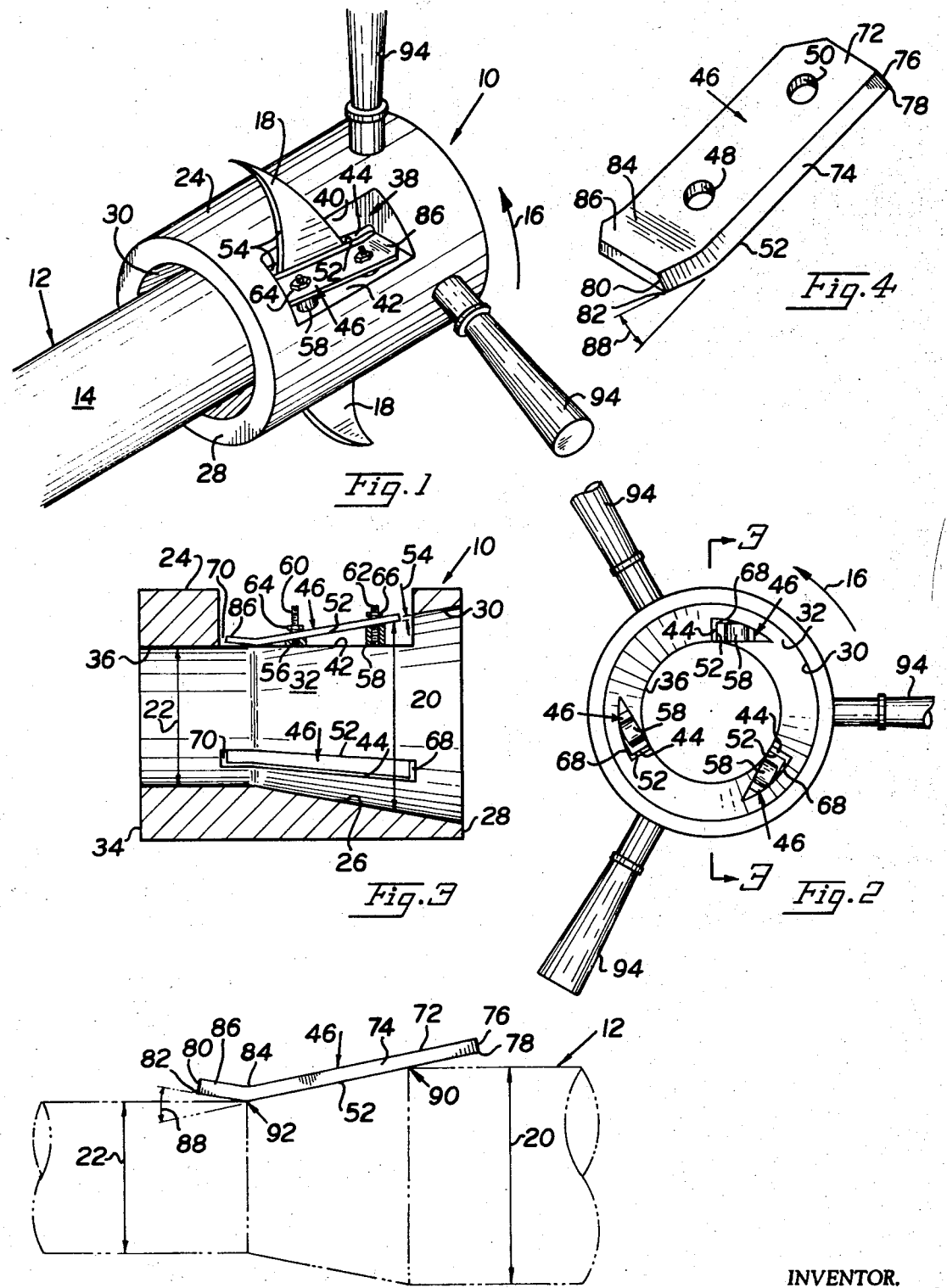
INVENTOR.
JAMES J. MATTHEWS
BY
ATTORNEY

United States Patent Office 3,566,466
Patented Mar. 2, 1971

---

3,566,466
CABLE REDUCING TOOL
James J. Matthews, Hicksville, N.Y.
(Landing Hill Road, East Haddam, Conn. 06423)
Filed Apr. 17, 1969, Ser. No. 816,911
Int. Cl. B21f *13/00*
U.S. Cl. 30—90.1                                        8 Claims

ABSTRACT OF THE DISCLOSURE

A cable reducing tool and a cutting implement for the same, the cutting implement having the trailing cutting end of its cutting edge in a clearance position such that the finish of the reduced cable is not marred, and the cable reducing tool may employ one or more of these noteworthy cutting implements to effectively produce the reduced cable not only with a substantially smooth finish but with minimum wear of the cutting implements.

---

The present invention relates generally to cable insulation cutting or reducing tools and, more particularly, to improvements in this type of tool as well as in the cutting implements or blades producing the cutting function thereof.

There are in use numerous types of cables, as exemplified by a typical electrical cable having a metal core protected against exposure by an outer covering of insulation, which in field use require a reduction in diameter along all or a selective lengthwise portion thereof. The materials of construction used for cable insulation usually permit removal of the insulation by cutting and there are many cable stripping tools available for this purpose. Although varying in their specific structural features, these cable stripping tools have in common the employment of at least one cutting implement or blade appropriately mounted with a cutting edge therealong in cutting contact with the cable to be reduced in diameter. Specifically, this cutting edge of necessity is oriented substantially axially of the cable and effectively cuts into and removes the cable covering in response to relatively rotative movement between the cable and cutting edge. During such typical cutting operation, the cable is eased past the leading end of the cutting edge and into cutting contact with the remaining cutting edge length, including the trailing end thereof. During use of these prior art cable stripping tools, contact of the cable with the blade trailing end, which has a cutting edge orientated substantially transversely of the cable axis, invariably results in the production of ridges and other undesirable marks on the surface of the reduced cable between practically each succeeding three hundred sixty degree relative rotational cutting transverse of the tool.

It is an object of the invention to provide a tool of improved characteristics, overcoming the foregoing shortcomings of the prior art, that will reduce the insulation of a cable to a desired diameter or to completely strip the insulation from the electrical conductor of the cable.

It is another object to provide a cable insulation without telltale surface markings, such as ridging, nicking, or the like.

Another object and feature is to provide an improved cable stripping tool which may include one or more of the noteworthy cutters or blades hereof, which effectively removes cable covering in adjacent or continuous lengthwise sections to correspondingly lessen the cutting force and wear that each cutter or blade is subjected to.

A cutting implement or blade for a cable reducing tool demonstrating objects and advantages of the present invention includes a substantially planar body having a cutting configuration along one of the longer sides thereof respectively terminating at opposite ends in a leading cutting end and point construction and in a trailing end and point construction. The blade trailing end, moreover, is displaced out of the plane of the remaining blade body such that when the blade is mounted in cutting position this trailing end may be free of contact with or coincident with the diameter of the reduced cable and, therefore, the production of ridging or the like in the reduced cable is significantly obviated or eliminated.

The above brief description, as well as further objects, features and advantages of the present invention, will be more fully appreciated by reference to the following detailed description of an illustrative embodiment constructed in accordance with the present invention, when taken in conjunction with the accompanying drawings, wherein:

FIG. 1 is a perspective view of a cable reducing tool according to the present invention in cutting operation about a cable;

FIG. 2 is a front elevational view of the cable reducing tool illustrating structural details of the cutting chamber thereof;

FIG. 3 is a side elevational view, in section taken on line 3—3 of FIG. 2, illustrating structural details of the cutting implements of the tool;

FIG. 4 is a perspective view of a cutting implement or blade; and

FIG. 5 is an isolated side elevational view of a use of the cutting implement or blade illustrating the manner in which it produces a reduced diameter cable and in which the cable is illustrated in phantom perspective.

Reference is now made to the drawings wherein there is shown a cable reducing tool, generally designated 10, demonstrating objects and advantages of the present invention. As is perhaps best illustrated in FIGS. 1 and 5, tool 10 is adapted to reduce the outer diameter of an electrical cable 12 which may have a core of electrical conductors (not shown) insulated by an appropriate covering 14. It sometimes happens that the cable 12 may be of a diameter that is greater than can be employed. Hence, it may be necessary to reduce its diameter in the field to the required size. Thus, the use of an oversize cable 12 often requires the reduction in the cable diameter which, in turn, of course necessitates removal of portions of the cable covering 14. As will be subsequently described in detail, this is achieved by inserting the cable 12 into the tool 10 and moving the tool through a rotative cutting stroke 16 about the cable. Alternatively, the cable 12 can be turned internally within and relative to the tool 10 producing the same result, namely, the removal of cable covering in lengthwise sections 18. As best illustrated in FIG. 5, the removal of the sections 18 results in the reduction of the cable diameter from an initial size 20 to a reduced diameter size 22.

Having particular reference now to FIGS. 1–3, tool 10 includes a body 24 having a centrally disposed through bore of a progressively diminishing extent which starts with a diameter slightly exceeding that of the initial cable diameter 20 and, at its smallest terminating dimension, is substantially equal in size to the reduced cable diameter 22. Specifically, the through bore provides an internal surface generally designated 26 which at one end 28 of the body 24 bounds a comparatively large diameter entrance opening 30 into an axial extent of the internal surface 26 which defines an internal cutting chamber 32 for the tool 10. At the opposite end 34 of body 24, and more particularly the portion thereof at which the progressively diminishing cutting chamber 32 assumes the size of the smaller diameter 22, the internal surface bounds an exit opening 36 for the reduced diameter of the cable 12. In lieu of a gradually diminishing cutting chamber 32 as illustrated herein, which is provided by the conically shaped internal surface 26, use can also be made of a cutting chamber in which diameter changes are achieved in discreet steps by reduced diameter sections. In such an embodiment, the cutting chamber of FIG. 3 would thus be just one cutting chamber to be followed by successive cutting in a subsequent cutting chamber in which the exit diameter 22 would be the larger entrance diameter into this cutting chamber.

Circumferentially spaced about the tool 24 are identically constructed cable removal openings generally identified as 38 which are each, as best shown in FIG. 1, formed by the intersection of a radially oriented wall 40 and a chordal disposed wall 42 which, at their intersection, bound an opening 44 having communication with the cutting chamber 32. In a preferred embodiment as illustrated herein, tool 10 has three such cable removal openings 38 equally spaced about the body 24 one hundred and twenty degrees from each other. The cutting of the cable 12 as is necessary to remove the lengthwise segments 18 of the covering 14, is achieved by use of plural cutting implements or blades, generally designated 46, each assigned to and operatively mounted in a cutting position in each of the cable removal openings 38.

Before considering the construction of each of the cutting implements 46, note at this time should be made of the manner in which each cutting implement is mounted in a cutting position in a cooperating one of the cable removal openings 38. Specifically, each cutting implement 46, as best shown in FIG. 4, has a pair of rearwardly disposed mounting openings 48 and 50 and is supported as best shown in FIGS. 1–3 on the wall 42 in an angular orientation inclined in the direction of the reduction in diameter of the cutting chamber 32. Moreover, as best illustrated in FIGS. 2 and 3, in the mounted position of each cutting implement 46 the forward or cutting edge 52, in fact, as is illustrated in FIG. 3, extends a slight distance 54 internally of the cutting chamber surface 26 and thus the distance 54 establishes the depth of cut which is made into the cable covering 14. This is more specifically demonstrated in FIG. 1 wherein the radial clearance between the cutting edge and the portion of the internal surface which bounds the opening 44 and the thickness of the removed cable section 18 are designated by the same reference numeral 54.

To achieve adjustability in the depth of cut into the cable covering 14, each cutting implement 46, as is illustrated in FIGS. 1 and 3, is mounted in the previously noted angularly oriented cutting position on appropriately sized vertical supports or spacing members 56 and 58 which each are respectively disposed on upstanding threaded members 60 and 62 appropraitely integrally joined to the wall 42. Threadably engaged with the members 60 and 62 are nuts 64 and 66 which hold the blade 46 in its supported position on the spacers 56 and 58. Although not shown, it should be readily understood that in lieu of the circular mounting openings 48 and 50 illustrated in FIG. 4, each cutting implement 46 can instead be provided with elongated slots 48 and 50 which, in an obvious manner, would then permit making chordally directed or axially directed adjustments in the position of each cutting implement 46 along the cutting chamber 32.

Specifically, when the cutting implements 46 have elongated sloted openings 48 and 50, these plural cutting implements can be advantageously mounted in the openings 44 such that each of them makes cutting contact successively with the cable 12. That is, the cutting implement 46 which is located closest to the entrance opening 30 will of course make initial cutting contact with the cable 12 followed by the establishment of cutting contact by a second cutting implement which would be located the second closest to the entrance opening 30, and so on. To allow for this contingency, the size of each cutting implement 46 is selected to be slightly less than the axial extent of a cable removal opening 38 leaving the clearance spaces 68 and 70 at opposite ends of each cutting implement 46, all as is clearly illustrated in FIG. 3.

Attention is now directed to the specific construction of a preferred embodiment of a cutting implement 46, which construction is best illustrated in FIG. 4. As clearly shown in this figure each cutting implement or blade 46 consists of a substantially planar body 72, rectangular in shape and having the previously noted cutting edge 52 formed along one of the elongated sides thereof. Specifically, this side is provided with a cutting configuration which produces the cutting edge 52 as a result of an angularly oriented bevel or surface 74 which intersects the flat undersurface of the body 72 to produce the edge 52. In addition to producing an edge 52 which is sharp enough to perform cutting, the angularly oriented surface or wall 74 also produces a sharp blade edge or end 76, which at the intersection with the edge 52 forms a cutting point 78 and, at the opposite side of the body 72, a second cutting end 80 having a cutting point 82.

In the mounted position of the cutting blade 46, as is illustrated in FIG. 5, blade end 76 is the first one to encounter the larger diameter of the cable 12 and is thus properly denominated the leading blade end, whereas the cutting end 80 and point 82 is the blade trailing end. A significant aspect of the blade 46 is that at a transverse location 84 spaced inwardly of the trailing end 80, the entire end portion of the blade, designated 86 in FIG. 4, is bent out of the plane of the remaining portion of the planar body 72, so that this end portion 86 and an imaginary extension of the body subtends an acute angle 88. The significance and benefits of this is best demonstrated in FIG. 5, to which specific reference is now made.

In FIG. 5, blade 46 is illustrated in a typical mounted cutting position projected into the cutting chamber 32 with the edge 52 in cutting contact with the cable 12. Specifically, this cutting contact is established only for a portion of the length of the cutting edge 52, this portion starting at the point where the cable initial diameter 20 intersects the cutting edge 52, as at 90, and terminates when the final reduced diameter 22 is reached, as at 92, which substantially corresponds with the previously noted location 84 where the blade end portion 86 is bent upwardly and out of the plane of the remaining body portion 72. As a consequence, the blade trailing end 80 and cutting point 82 formed on the end of the portion 86 occupy a clearance position from the reduced cable diameter 22. Thus, the blade trailing end 80 and cutting point 82 is effectively prevented from digging into and producing so-called ridging, nicking, and other undesirable marks in the external surface of the finished reduced cable diameter 22.

From the foregoing description it should be appreciated that angle 88 need not be limited to the extent as illustrated herein, but can be either greater or less than this amount. While there is no critical limitation on the amount of increase in this angle, the same should not be decreased to an extent which lowers the cutting end 80 and cutting point 82 below the external finished surface 22 of the reduced diameter cable 12. However, it should be understood that it is within the contemplated scope of the present invention that the angle 88 be of an extent which locates the blade end portion 86 in a substantially parallel relation to the reduced cable diameter 22 exiting from the tool 10.

Completing the tool 10 are appropriate means to facilitate turning the same through a rotative cutting stroke 16 in the form of radially extending hand grips, individually and collectively designated 94, by which the tool 10 can be rotated spirally and axially along a stationary cable 12.

During the relative rotation of the cable 12 and the tool 10, each of the blades 46 penetrates the insulated covering of the cable 12 inasmuch as each blade 46 is circumferentially spaced from the other when a plurality of blades are employed. Each blade will, therefore, form its own cutting path about the periphery of the cable 12. During initial relative rotation, the engagement of the blade with the surface of the cable 12 produces a triangularly shaped segment 18 as shown in FIG. 1. However, as relative rotation continues, and the surface of the cable becomes shaped, reduced in diameter, and tapered coincident to the shape and angular relationship of the cutting blades in the tool, the width of the segments 18 increase to the approximate length of that of the surface 74 of the blade. Thus, each blade makes its own independent penetration and cut on the surface of the cable and that segment 18 removed by each blade is in overlapping relationship with the segment removed by the next circumferentially spaced blade. As the surface of the cable is reduced by the blades 46, to the desired diameter, the transfer portion 84 of the cutting edge 52 completes the cut made about the cable.

The tool 10 has a tendency to feed itself axially along the length of the cable inasmuch as the surface 74 of the blade is directed at an angle to the axis of the cable. Thus, the tool has a tendency to feed upward along the cable toward the wider diameter. When more blades are employed, there is less friction generated per blade and, therefore, the tendency of the tool to feed axially along toward the larger diameter of the cable is greater than when a single blade is employed.

Each blade makes its last or finish cut along the surface of the cable at the point in the location 84 along the cutting edge 52, or as indicated in FIG. 4 at the point 92. The trailing end 86 of the blade is angled upward and away from the cable and thus there is no definite point on the cutting edge 52 which is left to leave a ridge or nick or other blemish on the cable. Rather, the rounded portion 92 leaves a smooth finish about the cable. This finish is further smoothed by the movement of another cutting blade whose rounded portion 92 passes over a portion of the previous surface, thereby smoothing whatever possible ridge may have been left by a previous cutting blade. Thus, there is consecutive movement of blade surfaces 92 about the cable resulting in the production of a smoothly finished cable diameter free of nicks, mars, ridges and other blemishes.

In practice, it has been found more convenient to raise the trailing end 86 such that its angle places its end point 82 entirely free of contact with the finished surface of the cable. This construction has been previously described. However, it has been found in practice, and it is within the contemplation of the invention, that the end 86 of the blade may define an angle 88 with respect to the edge 52 of the surface 74 of the same blade such that the angle is equal or substantially equal to that which the finished diameter 22 of the cable defines with respect to the angle formed on the cable by the surface 52 between the points 90 and 92 as illustrated in FIG. 5. In such arrangements, it has been found that the trailing end 86 continues to perform a very fine or light cutting operation about the surface of the cable in the event such surfaces should possibly have any ridges or undulations in it as a consequence of a misuse of the tool. The successive movements of the blade ends 86, because of the use of a plurality of cutting blades 46, results in an unusually smooth, conpleted, smaller diameter cable at 22.

A latitude of modification, change and substitution is intended in the foregoing disclosure and in some instances some features of the invention will be employed without a corresponding use of other features.

What is claimed is:

1. A cutting implement for use in a cable reducing tool of the type having
    an internal cutting chamber and means mounting said cutting implement in cutting relation to a cable inserted into said cutting chamber,
    said cutting implement comprising a substantially planar body having a cutting edge thereon,
    a cutting configuration formed along said cutting edge respectively terminating in oppositely disposed leading and trailing cutting ends,
    said portion of said body having said trailing cutting end being displaced out of the plane of said body,
    whereby during cutting operation said trailing cutting end is positioned relative to said cable so as to minimize undesirable marking of said cable.

2. A cutting implement as defined in claim 1 wherein the extent of said displacement of said trailing cutting end is such as to locate said trailing cutting end in a clearance position from said reduced cable.

3. A cutting implement as defined in claim 2 wherein the extent of said displacement of said trailing cutting end is such as to locate said trailing cutting end in a substantially parallel relationship to said reduced cable.

4. A cable reducing tool comprising
    a hollow body having an internal wall bounding a cutting chamber of a diminishing extent having an entrance and an exit opening at opposite ends,
    said body having a plurality of removal openings circumferentially spaced thereabout opening into said cutting chamber,
    plural cutting implements each respectively mounted in a cooperating one of said removal openings,
    said cutting implements each having a cutting edge thereon projected into said cutting chamber so as to cooperate with each other in making cutting contact with a cable outer surface in cutting position within said cutting chamber at plural circumferentially spaced locations about said cable equal in number to the number of said cutting implements,
    and means for causing relative rotative movement between said cable and cable reducing tool,
    whereby a thickness of the outer surface of said cable is removed by said cutting implements from about said cable for passage through said removal openings.

5. A cable reducing tool as defined in claim 4 wherein said hollow body internal wall is substantially conical in shape to thereby bound a cutting chamber of a progressively diminishing extent.

6. A cable reducing tool as defined in claim 4 wherein said plural cutting implements are mounted in axially overlapping relation so as to successively make cutting contact with said cable.

7. A cable reducing tool as defined in claim 6
    in which at least the last cutting implement to make cutting contact with said cable comprises a substantially planar body having a cutting configuration formed along said cutting edge respectively terminating in oppositely disposed leading and trailing cutting ends,
    said portion of said body having said trailing cutting end being displaced out of the plane of said body to thereby remove any undesirable marking on said cable produced by said other cutting implements.

8. A cable reducing tool as defined in claim 6
    wherein each said cutting implement comprises a substantially planar body having a cutting configuration formed along said cutting edge respectively terminating in oppositely disposed leading and trailing cutting ends,
    said portion of said body having said trailing cutting end being displaced out of the plane of said body, whereby during cutting operation said trailing cutting end is positioned relative to said cable so as to minimize undesirable marking of said cable.

References Cited

UNITED STATES PATENTS

| | | | |
|---|---|---|---|
| 212,256 | 2/1879 | Morse | 30—96 |
| 911,107 | 2/1909 | Bartholomäus | 30—95 |

FOREIGN PATENTS 287,302  3/1928  Great Britain.

OTHELL M. SIMPSON, Primary Examiner

G. SMITH, Assistant Examiner

U.S. Cl. X.R.

82—4.3; 144—30